(12) United States Patent
Park et al.

(10) Patent No.: US 10,914,912 B2
(45) Date of Patent: Feb. 9, 2021

(54) LENS ASSEMBLY, CAMERA MODULE, AND MOBILE ELECTRONIC DEVICE

(71) Applicant: Samsung Electro-Mechanics Co., Ltd., Suwon-si (KR)

(72) Inventors: Seong Chan Park, Suwon-si (KR); Sang Hyun Kwon, Suwon-si (KR); Hye Lee Kim, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 0 days.

(21) Appl. No.: 16/459,671

(22) Filed: Jul. 2, 2019

(65) Prior Publication Data

US 2020/0166725 A1 May 28, 2020

(30) Foreign Application Priority Data

Nov. 28, 2018 (KR) .......................... 10-2018-0149306

(51) Int. Cl.
*G02B 7/02* (2006.01)
*H04N 5/225* (2006.01)

(52) U.S. Cl.
CPC .............. *G02B 7/02* (2013.01); *H04N 5/2254* (2013.01); *H04N 5/22525* (2018.08)

(58) Field of Classification Search
CPC ..... H04N 5/2254; H04N 5/22525; G02B 7/02
See application file for complete search history.

(56) References Cited

U.S. PATENT DOCUMENTS

| 2007/0139939 | A1* | 6/2007 | Li | G02B 7/021 |
| | | | | 362/455 |
| 2010/0013985 | A1* | 1/2010 | Chang | H04N 5/2253 |
| | | | | 348/374 |
| 2015/0077840 | A1* | 3/2015 | Kim | G02B 7/08 |
| | | | | 359/355 |
| 2015/0085388 | A1* | 3/2015 | Matsusue | G02B 7/02 |
| | | | | 359/820 |
| 2016/0191767 | A1* | 6/2016 | Otani | G03B 17/02 |
| | | | | 348/373 |

FOREIGN PATENT DOCUMENTS

KR 10-2012-0076124 A 7/2012

* cited by examiner

*Primary Examiner* — Ahmed A Berhan
(74) *Attorney, Agent, or Firm* — NSIP Law

(57) ABSTRACT

A lens assembly includes a lens barrel formed of a first material, and a lens holder coupled to the lens barrel and formed of a second material, wherein a bonding portion in which the lens barrel and the lens holder are bonded to each other includes a mixed layer in which the first material and the second material are mixed with each other, and the bonding portion includes one or more voids.

20 Claims, 7 Drawing Sheets

A-A'

B

LENS ASSEMBLY, CAMERA MODULE, AND MOBILE ELECTRONIC DEVICE

CROSS-REFERENCE TO RELATED APPLICATIONS

This application claims benefit under 35 U.S.C. 119(a) of Korean Patent Application No. 10-2018-0149306 filed on Nov. 28, 2018, in the Korean Intellectual Property Office, the entire disclosure of which is incorporated herein by reference for all purposes.

BACKGROUND

1. Field

The present disclosure relates to a lens assembly, a camera module, and a mobile electronic device.

2. Description of the Background

In general, a camera module used in a mobile electronic device such as a smartphone includes a lens, a lens barrel in which the lens is mounted, and a lens holder supporting the lens barrel.

Methods of coupling the lens barrel and the lens holder may include: a screwing method in which screw threads are formed on an outer surface of the lens barrel and an inner surface of the lens holder, respectively, and then both are screwed together; and an adhesive bonding method in which the lens barrel and the lens holder are bonded to each other by an adhesive.

When using the screwing method, foreign materials may be generated in an assembling process, and the lens barrel may be assembled to be tilted with respect to an image sensor.

When using the adhesive bonding method, the adhesive may be over-injected and overflow, an assembled position of the lens barrel may be deviated in a curing process of the adhesive, or the lens disposed in the lens barrel may be deformed by heat for curing the adhesive.

The above information is presented as background information only to assist with an understanding of the present disclosure. No determination has been made, and no assertion is made, as to whether any of the above might be applicable as prior art with regard to the disclosure.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a lens assembly includes a lens barrel formed of a first material, and a lens holder coupled to the lens barrel and formed of a second material, wherein a bonding portion in which the lens barrel and the lens holder are bonded to each other includes a mixed layer in which the first material and the second material are mixed with each other, and wherein the bonding portion includes one or more voids.

The first material and the second material may each include plastic materials.

One or more of the first material and the second material may include any one of polycarbonate, polyarylate, polyphthalamide and liquid crystal polymer.

One or more of the first material and the second material may include a filler.

The mixed layer may include one or more of chloroform, cyclohexanone, tetrahydrofuran, ketone and benzene.

The mixed layer maybe spaced apart along and formed along a circumferential surface of the lens barrel.

The mixed layer may be continuously formed along a circumferential surface of the lens barrel.

A plurality of voids may be irregularly formed in the bonding portion.

The lens barrel and the lens holder may be spaced apart by at least 20 μm in a direction perpendicular to an optical axis direction in a region other than the bonding portion.

The second material may be different from the first material.

The lens barrel and the lens holder may include irregular concavo-convex facing surfaces adjacent the bonding portion.

In another general aspect, a camera module includes a lens barrel formed of a first material; a lens holder coupled to the lens barrel and formed of a second material; a housing accommodating the lens barrel and the lens holder therein; and a lens driving device including a magnet attached to the lens holder and a coil disposed to face the magnet, wherein the first material and the second material include the same or different plastic materials, wherein a bonding portion in which the lens barrel and the lens holder are bonded to each other includes a mixed layer in which the first material and the second material are mixed with each other, and wherein the bonding portion includes one or more voids.

The lens barrel and the lens holder are spaced apart from each other in a direction perpendicular to an optical axis direction in a region other than the bonding portion.

The camera module may be a mobile electronic device, further including an image sensor configured to convert light incident through the lens barrel to an electrical signal, and a display unit disposed on a surface of the mobile electronic device to display an image based on the electrical signal.

In another general aspect, a mobile electronic device includes a lens barrel configured to refract light on an image sensor to generate an electrical signal, a lens holder coupled to the lens barrel, a bonding portion disposed between the lens holder and the lens barrel bonding the lens holder to the lens barrel, wherein the bonding portion includes a mixed layer of a material of the lens barrel and a material of the lens holder, and a display unit configured to display an image in response to the electrical signal.

The material of the lens barrel and the material of the lens holder may include a same plastic material or different plastic materials.

Voids may be disposed in one or more of the lens barrel adjacent the bonding portion, the bonding portion, and the lens holder adjacent the bonding portion.

Surfaces of the lens barrel and the lens holder facing each other adjacent the bonding portion may be irregular.

Other features and aspects will be apparent from the following detailed description, the drawings, and the claims.

BRIEF DESCRIPTION OF DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

Figure 1:
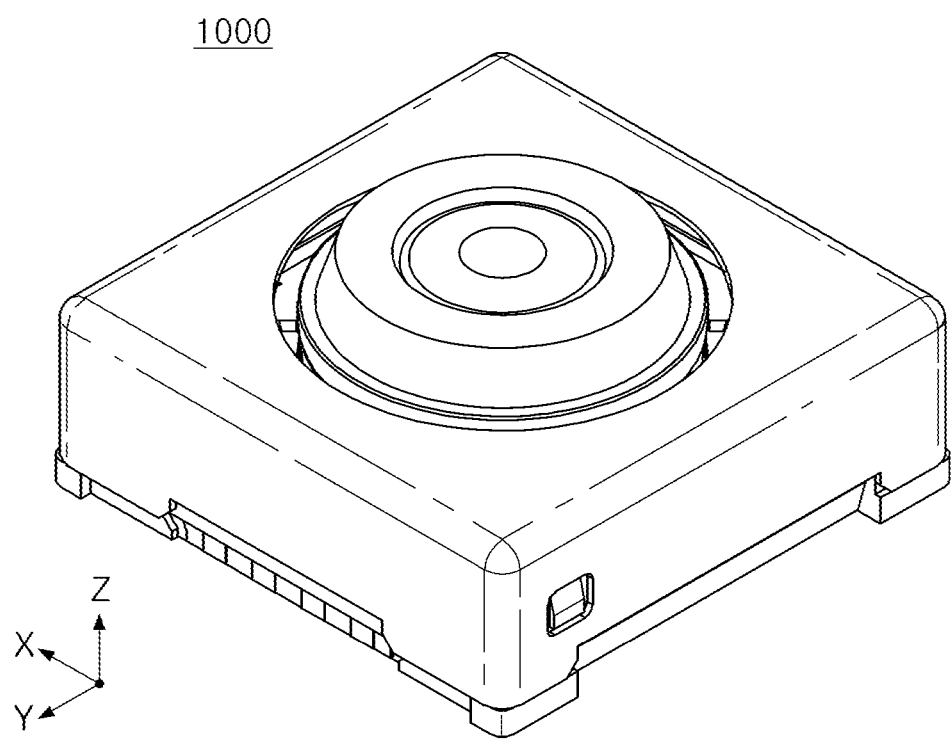
FIG. 1 is a perspective view illustrating a camera module according to one or more example embodiments.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of this disclosure. For example, the sequences of operations described herein are merely examples, and are not limited to those set forth herein, but may be changed as will be apparent after an understanding of this disclosure, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of this disclosure. Hereinafter, while embodiments of the present disclosure will be described in detail with reference to the accompanying drawings, it is noted that examples are not limited to the same.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items; likewise, "at least one of" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms such as "above," "upper," "below," and "lower" may be used herein for ease of description to describe one element's relationship to another element as shown in the figures. Such spatially relative terms are intended to encompass different orientations of the device in use or operation in addition to the orientation depicted in the figures. For example, if the device in the figures is turned over, an element described as being "above" or "upper" relative to another element will then be "below" or "lower" relative to the other element. Thus, the term "above" encompasses both the above and below orientations depending on the spatial orientation of the device. The device may also be oriented in other ways (for example, rotated 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Due to manufacturing techniques and/or tolerances, variations of the shapes shown in the drawings may occur. Thus, the examples described herein are not limited to the specific shapes shown in the drawings, but include changes in shape that occur during manufacturing.

The features of the examples described herein may be combined in various ways as will be apparent after an understanding of this disclosure. Further, although the examples described herein have a variety of configurations, other configurations are possible as will be apparent after an understanding of this disclosure.

Herein, it is noted that use of the term "may" with respect to an example, for example, as to what an example may include or implement, means that at least one example exists in which such a feature is included or implemented while all examples are not limited thereto.

An aspect of the present disclosure may provide a lens assembly, a camera module, and a mobile electronic device in which a lens barrel and a lens holder may be effectively coupled to each other without using an ultraviolet (UV) adhesive or a thermosetting adhesive.

A lens assembly according to the examples described herein may be provided in a camera module mounted in a mobile electronic device.

In the examples described herein, the mobile electronic device may refer to a portable electronic device such as a mobile communications terminal, a smartphone, a tablet PC or the like.

Figure 2:
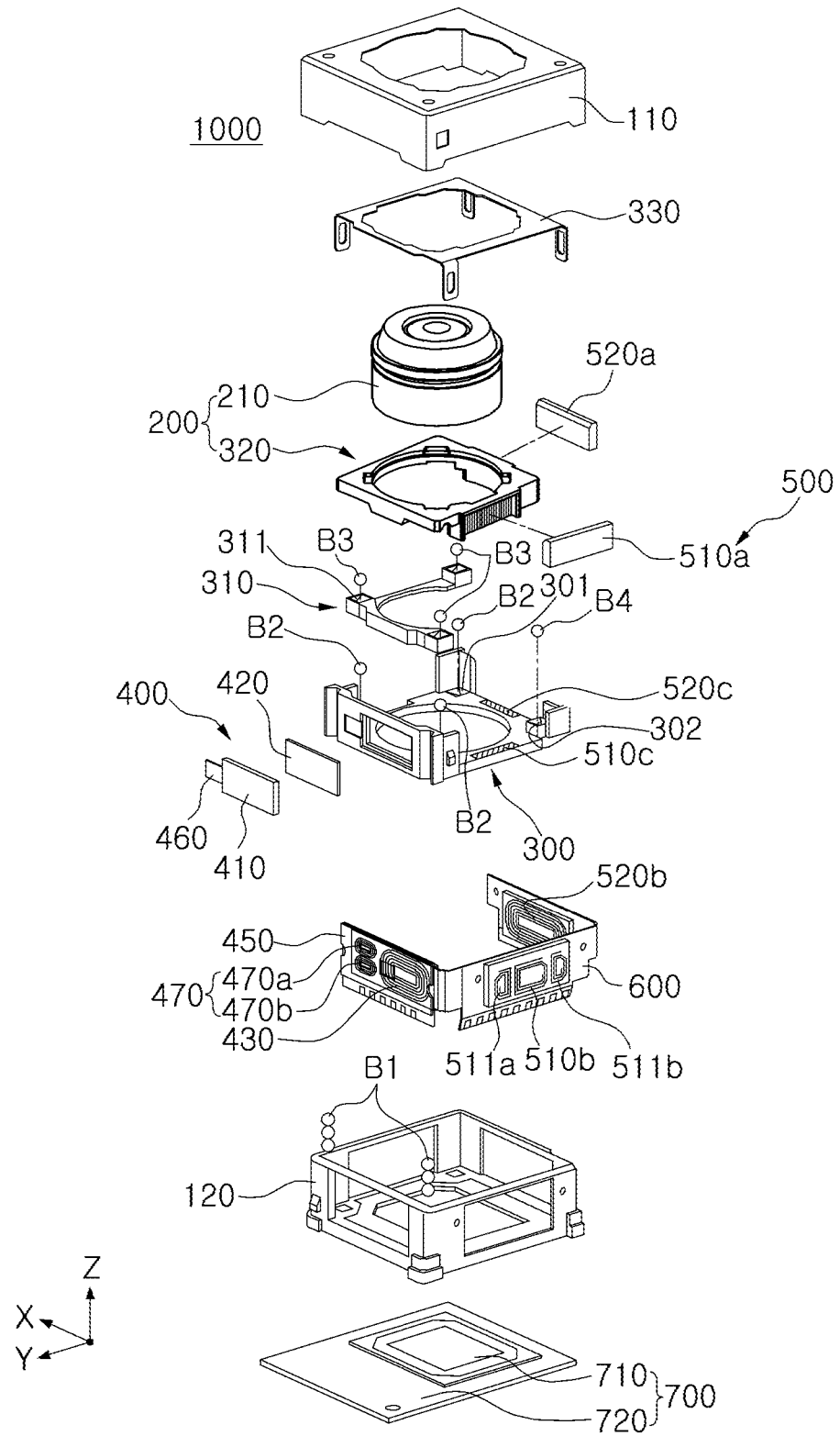
FIG. 2 is a schematic exploded perspective view illustrating the camera module according to one or more example embodiments.

FIG. 1 is a perspective view illustrating a camera module according to one or more examples described herein, and FIG. 2 is a schematic exploded perspective view illustrating the camera module according to one or more examples described herein.

Referring to FIGS. 1 and 2, a camera module 1000 according to an example may include a lens assembly 200, a lens driving device moving the lens assembly 200, an image sensor module 700 converting light incident thereto through the lens assembly 200 into an electrical signal, a housing 120 accommodating the lens assembly 200 and the lens driving device therein, and a case 110.

The lens assembly 200 may include a lens barrel 210 in which a lens is mounted and a lens holder 320 coupled to the lens barrel 210.

The lens barrel 210 may be in a hollow cylindrical shape so that a plurality of lenses imaging an object may be accommodated therein. The plurality of lenses may be arranged in the lens barrel 210 along an optical axis.

The number of the plurality of lenses arranged in the lens barrel 210 may depend on a design of the lens barrel 210, and the respective lenses may have optical characteristics such as the same or different refractive indices or the like.

The lens driving device may move the lens assembly 200.

For example, the lens driving device may perform a focusing by moving the lens assembly 200 in an optical axis (Z-axis) direction and perform an image stabilization when capturing an image by moving the lens assembly 200 in a direction (X-axis direction and/or Y-axis direction) perpendicular to the optical axis (Z-axis).

The lens driving device may include a focusing unit 400 performing the focusing and an image stabilizing unit 500 performing the image stabilization.

The image sensor module 700 may convert light passing through the lens into an electrical signal.

For example, the image sensor module 700 may include an image sensor 710 and a printed circuit board 720 connected to the image sensor 710, and may further include an infrared filter.

The infrared filter may serve to cut off light in an infrared region in the light passing through the lens.

The image sensor 710 may convert the light passing through the lens into the electrical signal. For example, the image sensor 710 may be a charge-coupled device (CCD) or a complementary metal-oxide-semiconductor (CMOS) device.

Figure 8A:
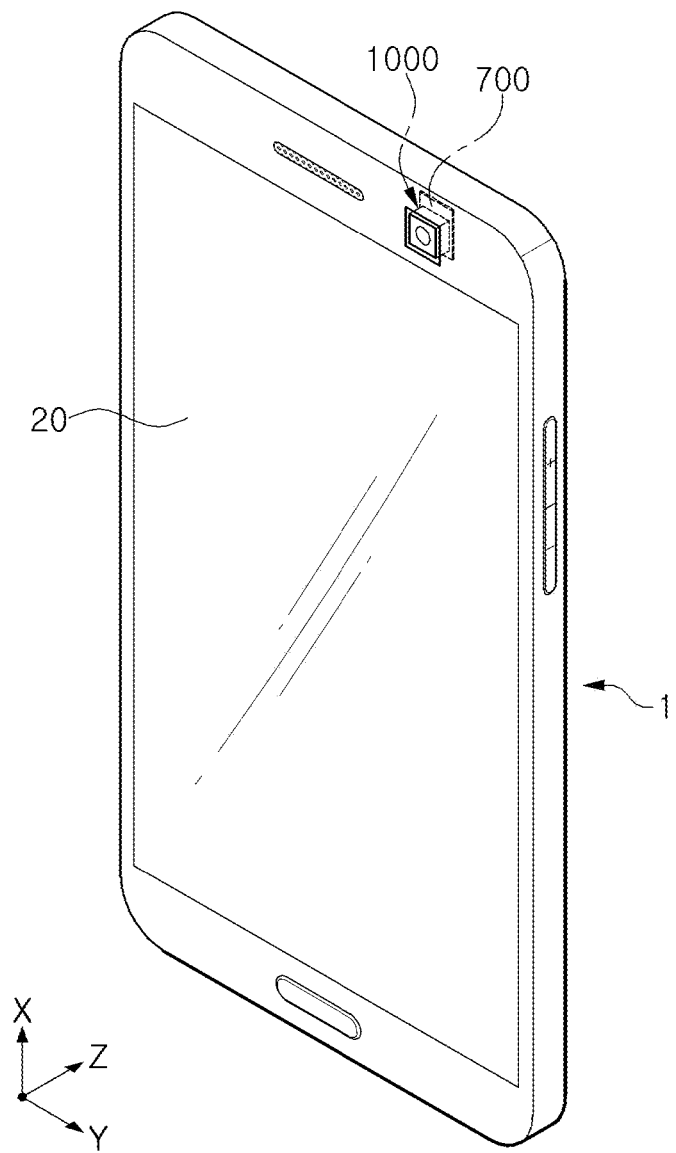
FIG. 8A and FIG. 8B are perspective views illustrating one or more examples of a camera module mobile electronic device.
Figure 8B:
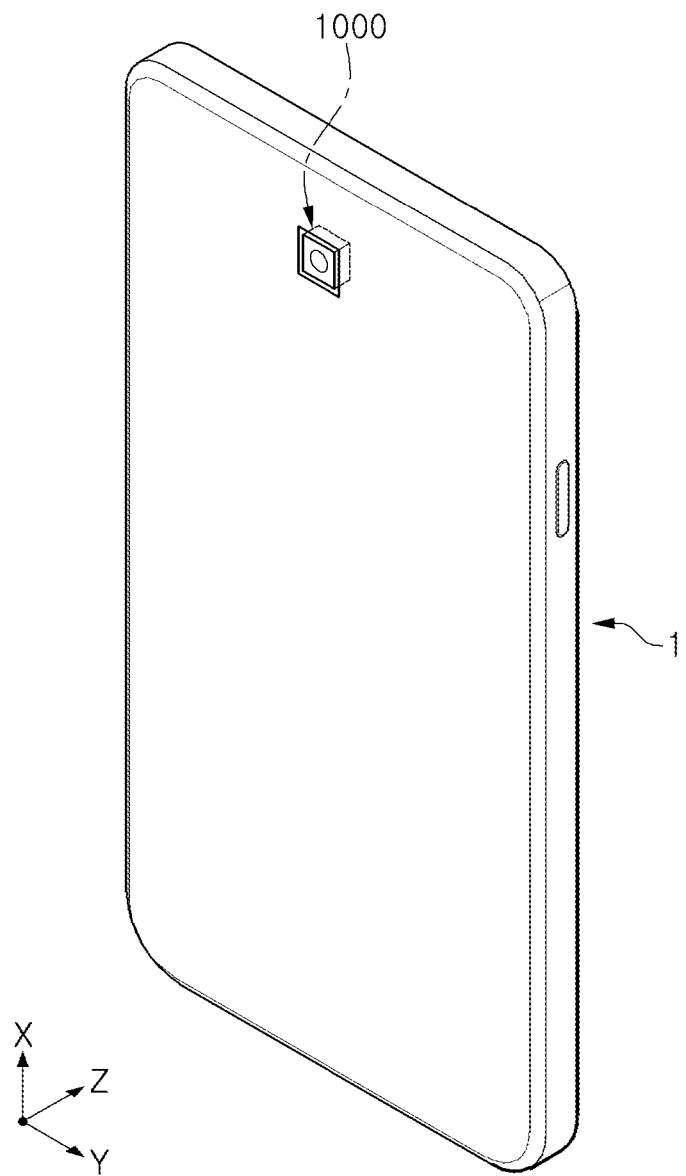

The electrical signal converted by the image sensor 710 may be output as an image through a display unit 20 (FIG. 8A) of a mobile electronic device 1 (FIGS. 8A and 8B).

The image sensor 710 may be fixed to the printed circuit board 720, and may be electrically connected to the printed circuit board 720 by wire bonding.

The lens assembly 200 and the lens driving device may be accommodated in the housing 120.

For example, the housing 120 may be in a shape of which the top and the bottom are opened, and the lens assembly 200 and the lens driving device may be accommodated in an internal space of the housing 120.

The image sensor module 700 may be disposed on the bottom of the housing 120.

In addition, a substrate 600 may be disposed on side surfaces of the housing 120 and provide the focusing unit 400 and the image stabilizing unit 500 with a driving signal. The substrate 600 may be a single substrate 600 which surrounds the side surfaces of the housing 120.

As described below, openings may be provided in the side surfaces of the housing 120 so that the openings may be inserted with a drive coil 430 and a first position detecting unit 470 of the focusing unit 400, and a first drive coil 510b, a second drive coil 520b, and a second position detecting unit of the image stabilizing unit 500.

The case 110 may be coupled to the housing 120, and may serve to protect internal components of the camera module 1000.

In addition, the case 110 may serve to shield electromagnetic waves.

For example, the case 110 may shield electromagnetic waves generated from the camera module so that the electromagnetic waves may not affect other electronic components in the mobile electronic device.

In addition, as several electronic components as well as the camera module are mounted in the mobile electronic device, the case 110 may also shield electromagnetic waves generated from these electronic components so that the electromagnetic waves may not affect the camera module.

The case 110 may be formed of a metal and be grounded to a ground pad provided on the printed circuit board 720 to shield the electromagnetic waves.

Referring to FIG. 2, the focusing unit 400 of the lens driving device of the camera module 1000 according to the examples disclosed herein is described.

The lens assembly 200 may be moved by the lens driving device in order to focus on an object.

For example, the focusing unit 400 in the present examples may move the lens assembly 200 in an optical axis (Z-axis) direction.

The focusing unit 400 may include a carrier 300 accommodating the lens assembly 200 therein, and a magnet 410 and the drive coil 430 generating driving force to move the lens assembly 200 and the carrier 300 in the optical axis (Z-axis) direction.

The magnet 410 may be mounted on the carrier 300. For example, the magnet 410 may be mounted on one surface of the carrier 300.

The drive coil 430 may be copper foil patterns stacked and buried in the substrate 600. The substrate 600 may be mounted on the side surfaces of the housing 120 so that the magnet 410 and the drive coil 430 face each other in a direction perpendicular to the optical axis (Z-axis).

The magnet 410 may be a moving member mounted on the carrier 300 and moved in the optical axis (Z-axis) direction together with the carrier 300, and the drive coil 430 may be a fixed member fixed to the housing 120.

When power is applied to the drive coil 430, the carrier 300 may be moved in the optical axis (Z-axis) direction by electromagnetic interaction between the magnet 410 and the drive coil 430.

As illustrated in FIG. 2, a frame 310 and the lens holder 320 are accommodated in the carrier 300 and the lens barrel 210 is mounted in the lens holder 320; therefore, the frame 310, the lens holder 320 and the lens barrel 210 may also be moved in the optical-axis (Z-axis) direction as the carrier 300 is moved.

Rolling members B1 may be disposed between the carrier 300 and the housing 120 to reduce friction between the carrier 300 and the housing 120 as the carrier 300 is moved. Each of the rolling members B1 may be in a ball shape.

The rolling members B1 may be disposed at both sides of the magnet 410.

A first yoke 450 may be disposed to face the magnet 410 in the direction perpendicular to the optical axis (Z-axis). For example, the first yoke 450 may be mounted on an outer side surface of the substrate 600 (i.e. the other surface of the substrate 600 opposing one surface of the substrate 600 in which the drive coil 430 is buried). Therefore, the first yoke 450 may be disposed to face the magnet 410 with the drive coil 430 interposed therebetween.

Attractive force may act between the first yoke 450 and the magnet 410 in the direction perpendicular to the optical axis (Z-axis).

Therefore, the rolling members B1 may be maintained in contact with the carrier 300 and the housing 120 by the attractive force between the first yoke 450 and the magnet 410.

In addition, the first yoke 450 may serve to focus magnetic force of the magnet 410. Therefore, a magnetic flux may be prevented from being leaked.

For example, the first yoke 450 and the magnet 410 may form a magnetic circuit.

Meanwhile, a second yoke 420 may be disposed between the magnet 410 and the carrier 300. The second yoke 420 may serve to focus magnetic force of the magnet 410. Therefore, a magnetic flux may be prevented from being leaked.

For example, the second yoke 420 and the magnet 410 may form a magnetic circuit.

In the present disclosure, a closed loop control manner may be used to detect and feed back a position of the lens assembly 200.

Therefore, the first position detecting unit 470 may be provided in order to perform a closed loop control. The first position detecting unit 470 may include a plurality of coils 470a and 470b and a control unit electrically connected to the plurality of coils 470a and 470b. The plurality of coils 470a and 470b may also be copper foil patterns stacked and buried in the substrate 600, similar to the drive coil 430. An exemplary embodiment in FIG. 2 illustrates the two coils 470a and 470b; however, three or more coils are also possible.

The first position detecting unit 470 may be disposed to face a sensing yoke 460 disposed adjacent to the magnet 410. The sensing yoke 460 may be mounted on one surface of the carrier 300, and may be a conductor or a magnetic body.

The first position detecting unit 470 may be disposed to face the sensing yoke 460 in the direction perpendicular to the optical axis (Z-axis). In addition, the first position detecting unit 470 may be disposed adjacent to the drive coil 430.

As the carrier 300 is moved in the optical axis (Z-axis) direction, the sensing yoke 460 mounted on the carrier 300 may also be moved in the optical-axis (Z-axis) direction. Therefore, an inductance of the first position detecting unit 470 may be changed. The control unit may receive an inductance value from the first position detecting unit 470 to detect a position of the lens barrel 210 (in the optical axis (Z-axis) direction).

Therefore, a position of the sensing yoke 460 may be detected from a change in the inductance of the first position detecting unit 470. The sensing yoke 460 may be mounted on the carrier 300; the lens barrel 210 may be accommodated in the carrier 300; and the carrier 300 may be moved in the optical axis (Z-axis) direction together with the lens barrel 210. Therefore, the position of the lens barrel 210 (in the optical axis (Z-axis) direction) may be finally detected from the change in the inductance of the first position detecting unit 470.

The first position detecting unit 470 may include a plurality of coils arranged in the optical axis (Z-axis) direction. For example, the first position detecting unit 470 may include the two coils 470a and 470b disposed in the optical axis (Z-axis) direction.

When the sensing yoke 460 is moved in the optical axis (Z-axis) direction, the position of the lens barrel 210 in the optical axis (Z-axis) direction may be detected more accurately using a difference between signals generated from the two coils 470a and 470b of the first position detecting unit 470.

Inductance values of the two coils 470a and 470b may depend on not only relative position differences between the two coils 470a and 470b and the sensing yoke 460 but also a temperature change in a surrounding environment or the like.

However, in the present examples, an accurate position of the lens barrel 210 may be detected by removing a factor caused by the temperature change in a surrounding environment or the like.

For example, as the sensing yoke 460 is moved, inductances of the two coils 470a and 470b may have increasing and decreasing directions different from each other. That is, when the inductance of one coil 470a is increased, the inductance of the other coil 470b may be decreased.

Therefore, when performing a subtraction between the inductance values of the two coils 470a and 470b, the factor caused by the temperature change in a surrounding environment may be removed, and accordingly, the position of the lens barrel 210 in the optical axis (Z-axis) direction may be accurately detected.

In the present examples, the first position detecting unit 470 is described to face the sensing yoke 460. However, the first position detecting unit 470 may also be disposed to face the magnet 410 without separately providing the sensing yoke 460.

Referring to FIG. 2, the image stabilizing unit 500 of the lens driving device of the camera module 1000 according to the examples disclosed herein is described.

The image stabilizing unit 500 may be used to correct image blurring or video shake occurring by a factor such as a user's handshake when capturing an image or recording a video.

For example, when a shake occurs during capturing the image by the user's handshake or the like, the image stabilizing unit 500 may compensate for the shake by allowing the lens barrel 210 to be relatively displaced to correspond to the shake.

For example, the image stabilizing unit 500 may move the lens barrel 210 in the direction perpendicular to the optical axis (Z-axis) to correct the shake.

The image stabilizing unit 500 may include a guide member which guides a movement of the lens barrel 210 and a plurality of magnets and a plurality of coils which generate driving force to move the guide member in the direction perpendicular to the optical axis (Z-axis).

The plurality of magnets may include a first magnet 510a and a second magnet 520a; and the plurality of coils may include the first drive coil 510b and the second drive coil 520b.

The guide member may include the frame 310 and the lens holder 320. The frame 310 and the lens holder 320 may be sequentially inserted into the carrier 300 in the optical axis (Z-axis) direction, and serve to guide the movement of the lens barrel 210.

The frame 310 and the lens holder 320 may each have a space into which the lens barrel 210 may be inserted. The lens barrel 210 may be inserted and fixed into the lens holder 320.

In the present examples, even though the guide member guiding the movement of the lens barrel 210 is used when correcting the shake, an overall height (height in the optical axis (Z-axis) direction) of the camera module may not be increased.

For example, the frame 310 of the guide member may be formed in a shape in which two sides of a square are removed when viewed from the optical axis (Z-axis) direction. Therefore, the frame 310 may be in a '⊐' or '∟' shape when viewed from the optical axis (Z-axis) direction.

The first magnet 510a and the second magnet 520a may be disposed on two open sides of the frame 310, respectively. Therefore, the first magnet 510a and the second magnet 520a may be disposed without being affected by a position of the frame 310, so that the overall height of the camera module may not be increased.

The frame 310 and the lens holder 320 may be moved in the direction perpendicular to the optical axis (Z-axis) with respect to the carrier 300 by the driving force generated by the plurality of magnets and the plurality of coils.

The first magnet 510a and the first drive coil 510b may generate the driving force in a first axis (X-axis) direction perpendicular to the optical axis (Z-axis); and the second magnet 520a and the second drive coil 520b may generate the driving force in a second (Y-axis) direction perpendicular to the first axis (X-axis). That is, the plurality of magnets and the plurality of coils may generate the driving forces in respective opposite directions.

Here, the second axis (Y-axis) refers to an axis perpendicular to both of the optical axis (Z-axis) and the first axis (X-axis).

The plurality of magnets may be disposed orthogonal to each other on a plane perpendicular to the optical axis (Z-axis); and the plurality of coils may also be disposed orthogonal to each other on the plane perpendicular to the optical axis (Z-axis).

The first magnet 510a and the second magnet 520a may be mounted on the lens holder 320. For example, the first magnet 510a and the second magnet 520a may be mounted on side surfaces of the lens holder 320, respectively. The side surfaces of the lens holder 320 may include a first surface and a second surface perpendicular to each other, and the first magnet 510a and the second magnet 520a may be disposed on the first surface and the second surface of the lens holder 320, respectively.

The first drive coil 510b and the second drive coil 520b may be copper foil patterns stacked and buried in the substrate 600. The substrate 600 may be mounted on side surfaces of the housing 120 so that the first magnet 510a and the first drive coil 510b face each other in a direction perpendicular to the optical axis (Z-axis), for example, the X-axis direction, and the second magnet 520a and the second drive coil 520b face each other in another direction perpendicular to the optical axis (Z-axis), for example, the Y-axis direction.

The first magnet 510a and the second magnet 520a may be moving members moved in directions perpendicular to the optical axis (Z-axis) together with the lens holder 320; and the first drive coil 510b and the second drive coil 520b may be fixed members fixed to the housing 120.

In the present examples, a plurality of ball members may be provided to support the frame 310 and the lens holder 320 of the image stabilizing unit 500. The plurality of ball members may serve to guide movements of the frame 310, the lens holder 320 and the lens barrel 210 in an image stabilizing process. In addition, the plurality of ball members may also serve to maintain respective intervals between the carrier 300, the frame 310 and the lens holder 320.

The plurality of ball members may include first ball members B2 and second ball members B3.

The first ball members B2 may guide movements of the frame 310, the lens holder 320 and the lens barrel 210 in the first axis (X-axis) direction; and the second ball members B3 may guide movements of the lens holder 320 and the lens barrel 210 in the second axis (Y-axis) direction.

For example, the first ball members B2 may be moved in a rolling motion in the first axis (X-axis) direction when the driving force is generated in the first axis (X-axis) direction. Therefore, the first ball members B2 may guide the movements of the frame 310, the lens holder 320 and the lens barrel 210 in the first axis (X-axis) direction.

In addition, the second ball members B3 may be moved in a rolling motion in the second axis (Y-axis) direction when the driving force is generated in the second axis (Y-axis) direction. Therefore, the second ball members B3 may guide the movements of the lens holder 320 and the lens barrel 210 in the second axis (Y-axis) direction.

The first ball members B2 may include a plurality of ball members arranged between the carrier 300 and the frame 310; and the second ball members B3 may include a plurality of ball members arranged between the frame 310 and the lens holder 320.

First guide groove portions 301 accommodating the first ball members B2 therein may be formed, respectively, on surfaces on which the carrier 300 and the frame 310 face each other in the optical axis (Z-axis) direction. The first guide groove portions 301 may include a plurality of guide grooves corresponding to the plurality of ball members, i.e. the first ball members B2.

The first ball members B2 may be accommodated in the first guide groove portions 301 and be fitted between the carrier 300 and the frame 310.

When accommodated in the first guide groove portions 301, the first ball members B2 may be restricted from being moved in the optical axis (Z-axis) direction and the second axis (Y-axis) direction, and may be allowed to be moved only in the first axis (X-axis) direction. For example, the first ball members B2 may be allowed to be moved in the rolling motion only in the first axis (X-axis) direction.

To this end, each plane of the plurality of guide grooves of the first guide groove portions 301 may have a rectangular shape which is long in the first axis (X-axis) direction.

Second guide groove portions 311 accommodating the second ball members B3 therein may be formed, respectively, on surfaces on which the frame 310 and the lens holder 320 face each other in the optical axis (Z-axis) direction. The second guide groove portions 311 may include a plurality of guide grooves corresponding to the plurality of ball members, i.e. the second ball members B3.

The second ball members B3 may be accommodated in the second guide groove portions 311 and be fitted between the frame 310 and the lens holder 320.

When accommodated in the second guide groove portions 311, the second ball members B3 may be restricted from being moved in the optical axis (Z-axis) direction and the first axis (X-axis) direction, and may be allowed to be moved only in the second axis (Y-axis) direction. For example, the second ball members B3 may be moved in the rolling motion only in the second axis (Y-axis) direction.

To this end, each plane of the plurality of guide grooves of the second guide groove portions 311 may have a rectangular shape which is long in the second axis (Y-axis) direction.

Meanwhile, in the examples described herein, third ball members B4 may be disposed between the carrier 300 and the lens holder 320 to support a movement of the lens holder 320.

The third ball members B4 may support the lens holder 320 which is moved in the first axis (X-axis) direction and the second axis (Y-axis) direction.

For example, the third ball members B4 may be moved in a rolling motion in the first axis (X-axis) direction when the driving force is generated in the first axis (X-axis) direction.

In addition, the third ball members B4 may be moved in the rolling motion in the second axis (Y-axis) direction when the driving force is generated in the second axis (Y-axis) direction.

Meanwhile, the second ball members B3 and the third ball members B4 may contact and support the lens holder 320.

Receiving grooves 302 accommodating the third ball members B4 therein may be formed, respectively, in one or more surfaces on which the carrier 300 and the lens holder 320 face each other in the optical axis (Z-axis) direction.

The third ball members B4 may be accommodated in the receiving grooves 302 and be fitted between the carrier 300 and the lens holder 320.

When accommodated in the receiving grooves 302, the third ball members B4 may be restricted from being moved in the optical axis (Z-axis) direction, and may be allowed to be moved in the rolling motion in the first axis (X-axis) direction and the second axis (Y-axis) direction.

To this end, the receiving grooves 302 may each have a plane formed in a circular shape. Therefore, the receiving grooves 302, the first guide groove portions 301 and the second guide groove portions 311 may have shapes different from each other.

The first ball members B2 may be moved in the rolling motion in the first axis (X-axis) direction; the second ball members B3 may be moved in the rolling motion in the second axis (Y-axis) direction; and the third ball members B4 may be moved in the rolling motion in the first axis (X-axis) direction and the second axis (Y-axis) direction.

Therefore, the plurality of ball members supporting the image stabilizing unit 500 according to the present examples may have freedom degrees different from each other.

Here, the freedom degree refers to the number of independent variables required for representing a motion state of an object in a three-dimensional (3D) coordinate system.

In general, 6 may be a freedom degree of the object in the 3D coordinate system. A movement of the object may be represented by an orthogonal coordinate system having three directions and a rotary coordinate system having three directions.

For example, the object in the 3D coordinate system may be moved in a translation motion along the respective axes (X-axis, Y-axis and Z-axis), and may be moved in a rotation motion with respect to the respective axes (X-axis, Y-axis and Z-axis).

In the present examples, the freedom degree refers to the number of independent variables required for representing movements of the first ball members B2, the second ball members B3, and the third ball members B4 when the image stabilizing unit 500 is moved by the driving force generated in the direction perpendicular to the optical axis (Z-axis) by applying power to the image stabilizing unit 500.

For example, the third ball members B4 may be moved in the rolling motion along two axes (the first axis (X-axis) and the second axis (Y-axis)), and the first ball members B2 and the second ball members B3 may be moved in the rolling motion along a single axis (the first axis (X-axis) or the second axis (Y-axis)), by the driving force generated in the direction perpendicular to the optical axis (Z-axis).

Therefore, a freedom degree of the third ball members B4 may be different from those of the first ball members B2 and the second ball members B3.

When the driving force is generated in the first axis (X-axis) direction, the frame 310, the lens holder 320 and the lens barrel 210 may be moved together in the first axis (X-axis) direction.

Here, the first ball members B2 and the third ball members B4 may be moved in the rolling motion along the first axis (X-axis). In this case, the movements of the second ball members B3 may be restricted.

In addition, when the driving force is generated in the second axis (Y-axis) direction, the lens holder 320 and the lens barrel 210 may be moved in the second axis (Y-axis) direction.

Here, the second ball members B3 and the third ball members B4 may be moved in the rolling motion along the second axis (Y-axis). In this case, the movements of the first ball members B2 may be restricted.

In the examples described herein, a plurality of yokes 510c and 520c may be provided so that the image stabilizing unit 500 and the first to third ball members B2, B3 and B4 are maintained in contact with each other.

The plurality of yokes 510c and 520c may be fixed to the carrier 300, and may be disposed to face the first magnet 510a and second magnet 520a, respectively, in the optical axis (Z-axis) direction.

Therefore, attractive force may be generated between the plurality of yokes 510c and 520c and the first magnet 510a and the second magnet 520a in the optical axis (Z-axis) direction, respectively.

The image stabilizing unit 500 may be pressed toward the plurality of yokes 510c and 520c by the attractive force between the plurality of yokes 510c and 520c and the first magnet 510a and the second magnet 520a, so that the frame 310 and the lens holder 320 of the image stabilizing unit 500 may be maintained in contact with the first to third ball members B2, B3, and B4.

The plurality of yokes 510c and 520c may be formed of a material that may generate the attractive force between the plurality of yokes 510c and 520c and the first magnet 510a and the second magnet 520a. For example, the plurality of yokes 510c and 520c may be formed of a magnetic material.

In the present examples, the plurality of yokes 510c and 520c may be provided so that the frame 310 and the lens holder 320 may be maintained in contact with the first to third ball members B2, B3 and B4. A stopper 330 may be provided in order to prevent the first to third ball members B2, B3 and B4, the frame 310 and the lens holder 320 from being externally separated from the carrier 300 by external impact or the like.

The stopper 330 may be coupled to the carrier 300 to cover at least a portion of an upper surface of the lens holder 320.

In the present examples, a closed loop control manner may be used to detect and feed back a position of the lens barrel 210 in the image stabilizing process.

Therefore, a second position detecting unit may be provided in order to perform the closed loop control. The second position detecting unit may be configured to detect the position of the lens barrel 210 in the first axis (X-axis) direction and the second axis (Y-axis) direction.

The second position detecting unit may include a plurality of coils and a control unit electrically connected to the plurality of coils. The control unit may receive inductance values from the plurality of the coils to detect the position of the lens barrel 210 in the first axis (X-axis) direction and the second axis (Y-axis) direction.

The plurality of coils may also be copper foil patterns stacked and buried in the substrate 600, similar to the first drive coil 510*b*.

The plurality of coils may be disposed on both sides of the first drive coil 510*b* or both sides of the second drive coil 520*b*. For example, when the plurality of coils are two coils, respective coils may be disposed on both sides of the first drive coil 510*b* or both sides of the second drive coil 520*b*.

Hereinafter, for convenience of explanation, the plurality of coils are described as disposed on both sides of the first drive coil 510*b*, but it is also possible that the plurality of coils are disposed on both sides of the second drive coil 520*b*.

The first magnet 510*a* may be disposed to face the first drive coil 510*b* in the first axis (X-axis) direction. In addition, the first magnet 510*a* may be disposed in such a manner that one side of the first magnet 510*a* may partially face one of the plurality of coils of the second position detecting unit and the other side of the first magnet 510*a* may partially face the other one of the plurality of coils of the second position detecting unit.

Here, a 1-1-th sensing coil 511*a* refers to a coil partially facing the one side of the first magnet 510*a*, and a 1-2-th sensing coil 511*b* refers to a coil partially facing the other side of the first magnet 510*a*.

As the first magnet 510*a* is moved in the first axis (X-axis) direction and/or the second axis (Y-axis) direction, inductances of the plurality of coils 511*a* and 511*b* of the second position detecting unit may be changed.

Therefore, a position of the first magnet 510*a* may be detected from a change in the inductances of the plurality of coils 511*a* and 511*b*. The first magnet 510*a* is mounted on the lens holder 320; the lens barrel 210 is mounted on the lens holder 320; and the lens holder 320 is moved in the first axis (X-axis) direction and/or the second axis (Y-axis) direction together with the lens barrel 210. Therefore, the position of the lens barrel 210 (in the first axis (X-axis) direction and/or the second axis (Y-axis) direction) may be finally detected from the change in the inductances of the plurality of coils 511*a* and 511*b* of the second position detecting unit.

Hereinafter, described is a method of detecting the position of the lens barrel 210 in the first axis (X-axis) direction.

When the lens barrel 210 is moved in the first axis (X-axis) direction, inductances of the 1-1-th sensing coil 511*a* and the 1-2-th sensing coil 511*b* may have the same increasing and decreasing directions.

Therefore, the second position detecting unit of the camera module 1000 according to the examples described herein, may be configured to accurately detect the position of the lens barrel 210 in the first axis (X-axis) direction: by using any one of inductance values of the 1-1-th sensing coil 511*a* and the 1-2-th sensing coil 511*b*, which depends on the movement of the lens barrel 210; or by using a value obtained by adding up the two inductance values.

Hereinafter, described is a method of detecting the position of the lens barrel 210 in the second axis (Y-axis) direction.

When the lens barrel 210 is moved in the second axis (Y-axis) direction, the inductances of the 1-1-th sensing coil 511*a* and the 1-2-th sensing coil 511*b* may have the increasing and decreasing directions different from each other.

Therefore, the second position detecting unit of the camera module 1000 according to the examples described herein, may be configured to accurately detect the position of the lens barrel 210 in the second axis (Y-axis) direction by performing a subtraction between the inductance values of the 1-1-th sensing coil 511*a* and the 1-2-th sensing coil 511*b*.

Referring to FIG. 2, the first ball members B2 may be accommodated in the first guide groove portions 301 and be fitted between the carrier 300 and the frame 310. The second ball members B3 may be accommodated in the second guide groove portions 311 and be fitted between the frame 310 and the lens holder 320. The third ball members B4 may be accommodated in the receiving grooves 302 and be fitted between the carrier 300 and the lens holder 320.

Figure 3:
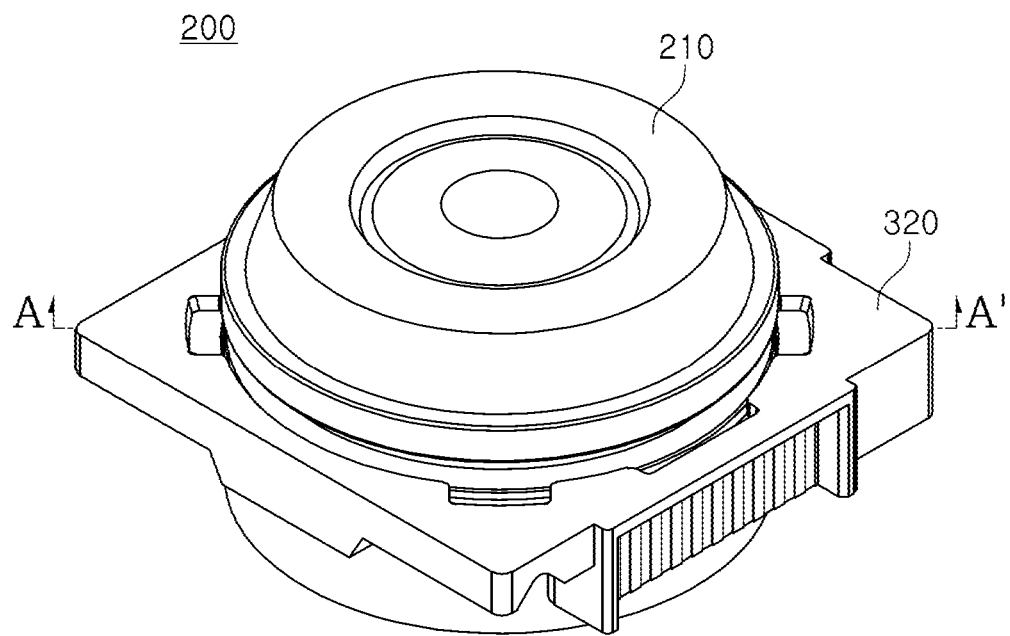
FIG. 3 is a perspective view of a lens assembly according to one or more embodiments.
Figure 4:
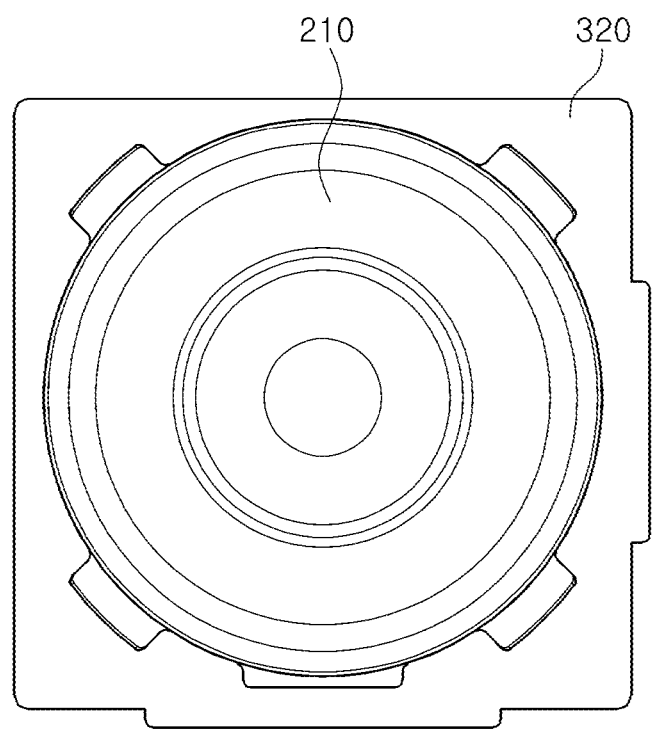
FIG. 4 is a plan view of a lens assembly according to one or more embodiments.

FIG. 3 is a perspective view of a lens assembly according to one or more examples described herein, and FIG. 4 is a plan view of the lens assembly according to one or more examples described herein.

Figure 5:
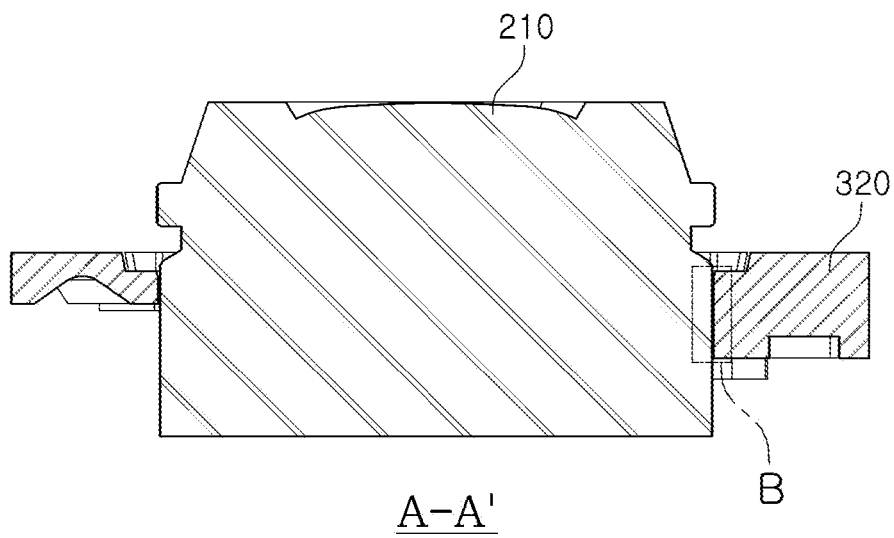
FIG. 5 is a cross-sectional view taken along line A-A' of FIG. 3.
Figure 6:
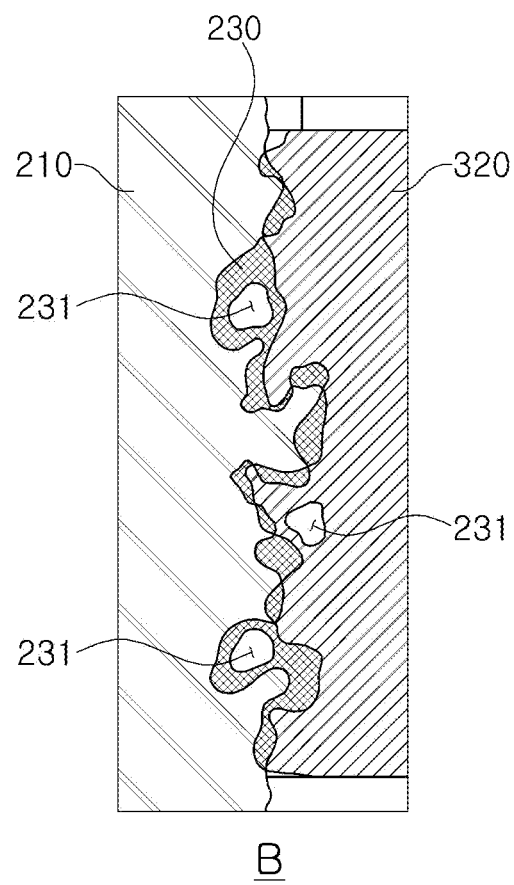
FIG. 6 is an enlarged view of part B of FIG. 5.

FIG. 5 is a cross-sectional view taken along line A-A' of FIG. 3; and FIG. 6 is an enlarged view of part B of FIG. 5.

Figure 7:
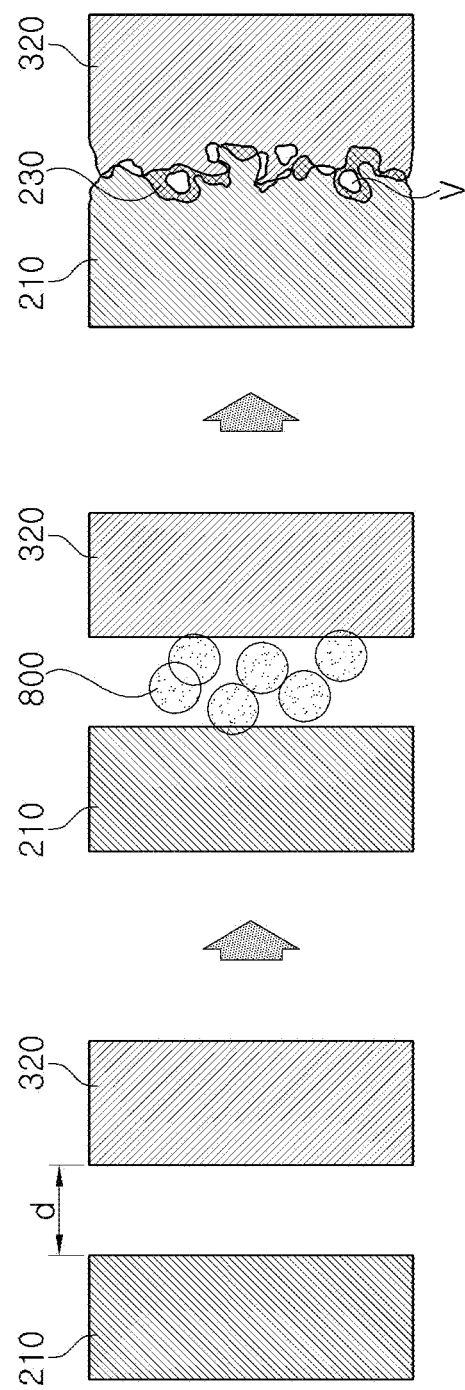
FIG. 7 is a schematic view illustrating a process in which a lens barrel and a lens holder are bonded to each other according to one or more example embodiments.

In addition, FIG. 7 is a schematic view illustrating a process in which a lens barrel and a lens holder are bonded to each other.

In general, methods of coupling the lens barrel and the lens holder may include a screwing method and an adhesive bonding method.

In the screwing method, screw threads are formed on an outer surface of the lens barrel and an inner surface of the lens holder, respectively, and then screwed to each other.

However, when using the screwing method, foreign materials may be generated in an assembling process by friction between the lens barrel and the lens holder. In addition, an assembly tilt may occur in the assembling process. The assembly tilt refers to a state in which when the lens barrel and the lens holder are assembled to each other, a verticality of the lens with respect to the image sensor is deviated from a designed verticality. In recent years, as the camera module has been miniaturized, such a small error may affect an image quality.

In the adhesive bonding method, instead of forming the screw threads in the lens barrel and the lens holder, the lens barrel may be inserted into the lens holder, and applied and cured with the adhesive, so that the lens barrel is fixed to the lens holder.

However, when using the adhesive bonding method, it is difficult to control an application amount of the adhesive, and the position of the lens barrel may be deviated in a curing process of the adhesive. In particular, the lens disposed in the lens barrel may be deformed by heat for curing the adhesive.

In the examples described herein, the lens barrel 210 and the lens holder 320 may be coupled to each other using a coupling method other than the screwing method and the adhesive bonding method.

An insertion hole may be formed at a center of the lens holder 320, and the lens barrel 210 may be inserted into the insertion hole. The insertion hole may be formed to have a diameter slightly larger than an outer diameter of the lens barrel 210. For example, an outer surface of the lens barrel 210 may be spaced apart from an inner surface of the lens holder 320 by a distance "d."

A bonding portion 230 may be formed between the lens barrel 210 and the lens holder 320, and the lens barrel 210 and the lens holder 320 may be directly bonded to each other by the bonding portion 230. Here, the bonding portion 230 may be formed by melting a portion of the lens barrel 210 and a portion of the lens holder 320. Therefore, the lens barrel 210 may be bonded to the lens holder 320 without using an adhesive agent separately.

At least a portion of an outer surface of the lens barrel 210 and at least a portion of an inner surface of the lens holder 320 may be melted and then bonded to each other. That is, at least portions in the surfaces of the lens barrel 210 and the lens holder 320 facing each other may be melted and then bonded to each other to form a bonding portion 230.

Irregular concavo-convex structures may be formed on portions of the surfaces of the lens barrel 210 and the lens holder 320 facing each other, and the portions are adjacent to the bonding portion 230. That is, an interface between the lens barrel 210 and the bonding portion 230 and an interface between the lens holder 320 and the bonding portion 230 may include the irregular concavo-convex structures.

A space of at least 20 μm may be provided between the outer surface of the lens barrel 210 and the inner surface of the lens holder 320 facing each other in the direction perpendicular to the optical axis direction. That is, the space of at least 20 μm may be provided in a region other than the bonding portion 230 between the lens barrel 210 and the lens holder 320 in the direction perpendicular to the optical axis.

The lens barrel 210 may be formed of a first material, the lens holder 320 may be formed of a second material, and the first material and the second material may include plastic materials, respectively.

One or more of the first material and the second material may include any one of polycarbonate, polyarylate, polyphthalamide and liquid crystal polymer.

Here, the first material and the second material may include the same or different plastic materials.

One or more of the first material and the second material may include a filler.

The filler is a material used to improve physical properties of the first material and the second material.

One or more voids 231 may be formed in the bonding portion 230 in which the lens barrel 210 and the lens holder 320 are bonded to each other. A plurality of voids 231 may be irregularly formed.

The voids 231 may also be formed in a region other than the bonding portion 230, for example, in a portion of the lens barrel 210 and/or a portion of the lens holder 320.

In a bonding process, a volatile material 800 may be used to form the bonding portion 230. The volatile material 800 may be used to cause melting of at least a portion of the lens barrel 210 and at least a portion of the lens holder 320.

For example, the volatile material 800 may be one or more of chloroform, cyclohexanone, tetrahydrofuran, ketone and benzene.

As illustrated in FIG. 7, when the volatile material 800 is applied between the lens barrel 210 and the lens holder 320, the lens barrel 210 and the lens holder 320 may be temporarily melted, and the melted materials may be mixed with each other to form the bonding portion 230.

Therefore, the bonding portion 230 may include a mixed layer in which the first material of the lens barrel 210 and the second material of the lens holder 320 are mixed with each other.

The volatile material 800 may be totally volatilized from or partially left in the bonding portion 230 after melting the surfaces of the lens barrel 210 and the lens holder 320.

The volatile material 800 may be spaced apart along and applied along a circumferential surface of the lens barrel 210 or may be continuously applied along the circumferential surface of the lens barrel 210. The circumferential surface of the lens barrel 210, for example, refers to an outer periphery of the lens barrel.

Therefore, the bonding portion 230 may be spaced apart along and formed along the circumferential surface of the lens barrel 210 or may be continuously formed along the circumferential surface of the lens barrel 210.

Referring to FIGS. 8A and 8B, the camera module 1000, according to examples described herein, may be a mobile electronic device 1, and further include a display unit 20, wherein the camera module 1000 is installed as a front camera of the mobile electronic device 1 along with the display unit 20 or as a back camera on a side of the mobile electronic device 1 other than a side with the display unit 20. As described in the various examples, an electrical signal converted by an image sensor 710 of the camera module 1000 may be output as an image via the display unit 20 of the mobile electronic device 1.

As set forth above, in the lens assembly, the camera module, and the mobile electronic device according to the examples described herein, the lens barrel and the lens holder may be effectively coupled to each other without using an ultraviolet (UV) adhesive or a thermosetting adhesive.

While specific examples have been shown and described above, it will be apparent after an understanding of this disclosure that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of this disclosure is defined not by the detailed description, but by the claims and their equivalents, and all variations within the scope of the claims and their equivalents are to be construed as being included in this disclosure.

What is claimed is:

1. A lens assembly comprising:
    a lens barrel formed of a first material; and
    a lens holder coupled to the lens barrel and formed of a second material,
    wherein a bonding portion in which the lens barrel and the lens holder are bonded to each other comprises a mixed layer in which the first material and the second material have been melted together with each other, and
    the bonding portion comprises one or more voids.

2. The lens assembly of claim 1, wherein the first material and the second material each comprise at least one plastic material.

3. The lens assembly of claim 2, wherein either one or both of the first material and the second material comprises any one of polycarbonate, polyarylate, polyphthalamide, and liquid crystal polymer.

4. The lens assembly of claim 3, wherein either one or both of the first material and the second material comprises a filler.

5. The lens assembly of claim 1, wherein the mixed layer comprises one or more of chloroform, cyclohexanone, tetrahydrofuran, ketone, and benzene.

6. The lens assembly of claim 1, wherein the mixed layer is spaced apart along and formed along a circumferential surface of the lens barrel.

7. The lens assembly of claim 1, wherein the mixed layer is continuously formed along a circumferential surface of the lens barrel.

8. The lens assembly of claim 1, wherein the one or more voids comprise a plurality of voids irregularly formed in the bonding portion.

9. The lens assembly of claim 1, wherein the lens barrel and the lens holder are spaced apart from each other by at least 20 μm in a direction perpendicular to an optical axis of the camera module in a region other than the bonding portion.

10. The lens assembly of claim 1, wherein the second material is different from the first material.

11. The lens assembly of claim 1, wherein the lens barrel and the lens holder comprise irregular concavo-convex surfaces adjacent the bonding portion.

12. A camera module comprising:
a lens barrel formed of a first material;
a lens holder coupled to the lens barrel and formed of a second material;
a housing accommodating the lens barrel and the lens holder therein; and
a lens driving device comprising a magnet attached to the lens holder and a coil disposed to face the magnet,
wherein the first material and the second material comprise a same plastic material or different plastic materials,
a bonding portion in which the lens barrel and the lens holder are bonded to each other comprises a mixed layer in which the first material and the second material have been melted together with each other, and
the bonding portion comprises one or more voids.

13. The camera module of claim 12, wherein either one or both of the first material and the second material comprises a filler.

14. The camera module of claim 12, wherein the lens barrel and the lens holder are spaced apart from each other in a direction perpendicular to an optical axis of the camera module in a region other than the bonding portion.

15. The camera module of claim 12, wherein the lens barrel and the lens holder comprise irregular concavo-convex surfaces adjacent the bonding portion.

16. A mobile electronic device comprising:
the camera module of claim 12;
an image sensor configured to convert light incident through the lens barrel to an electrical signal; and
a display unit disposed on a surface of the mobile electronic device to display an image based on the electrical signal.

17. A mobile electronic device comprising:
a lens barrel configured to refract light onto an image sensor configured to convert the refracted light to an electrical signal;
a lens holder coupled to the lens barrel;
a bonding portion disposed between the lens holder and the lens barrel bonding the lens holder to the lens barrel, wherein the bonding portion comprises a mixed layer in which a material of the lens barrel and a material of the lens holder have been melted together with each other; and
a display unit configured to display an image in response to the electrical signal.

18. The mobile electronic device of claim 17, wherein the material of the lens barrel and the material of the lens holder comprise a same plastic material or different plastic materials.

19. The mobile electronic device of claim 17, wherein voids are disposed in any one or any combination of any two or more of the lens barrel adjacent the bonding portion, the bonding portion, and the lens holder adjacent the bonding portion.

20. The mobile electronic device of claim 17, wherein surfaces of the lens barrel and the lens holder facing each other adjacent the bonding portion are irregular.

* * * * *